(12) United States Patent
Yu et al.

(10) Patent No.: US 11,837,021 B1
(45) Date of Patent: Dec. 5, 2023

(54) COMPOUND EXPRESSION RECOGNITION METHOD WITH FEW SAMPLES OF MULTI-DOMAIN ADVERSARIAL LEARNING

(71) Applicant: HUAZHONG UNIVERSITY OF SCIENCE AND TECHNOLOGY, Hubei (CN)

(72) Inventors: Li Yu, Hubei (CN); Shuangjiang He, Hubei (CN); Huijuan Zhao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/346,760

(22) Filed: Jul. 3, 2023

(30) Foreign Application Priority Data

Jul. 12, 2022 (CN) .......................... 202210812089.6

(51) Int. Cl.
*G06V 40/16* (2022.01)
*G06V 10/764* (2022.01)
*G06V 10/80* (2022.01)
*G06V 10/774* (2022.01)

(52) U.S. Cl.
CPC .......... *G06V 40/176* (2022.01); *G06V 10/764* (2022.01); *G06V 10/774* (2022.01); *G06V 10/806* (2022.01); *G06V 40/165* (2022.01); *G06V 40/172* (2022.01)

(58) Field of Classification Search
CPC .. G06V 40/176; G06V 10/764; G06V 10/774; G06V 10/806; G06V 40/165; G06V 40/172
See application file for complete search history.

(56) References Cited

U.S. PATENT DOCUMENTS 10,504,268 B1 * 12/2019 Huang ................. G06V 10/772
2022/0245961 A1 * 8/2022 Yan ....................... G06T 11/001

OTHER PUBLICATIONS

Liang et al. "Fine-Grained Facial Expression Recognition in the Wild". (Year: 2021).*

* cited by examiner

*Primary Examiner* — Phuoc Tran
(74) *Attorney, Agent, or Firm* — JCIPRNET

(57) ABSTRACT

Disclosed is a compound expression recognition method with few samples of multi-domain adversarial learning. To extract compound expression features with diversity and complexity with few samples, multiple small sample datasets are fused, and divided into expression sub-domains, and multi-domain adversarial learning is performed to improve the performance of compound expression recognition. Based on the generative adversarial network framework, the face domain and the contour-independent compound expression domain are fused in the generative network to enhance diversity and complexity, and two discriminators are designed to guide the generator. The face discriminator uses the face domain to guide the generator and identify the generator to generate expression-independent face identity attributes, so that the generator has identity diversity. The compound expression fusing discriminator fuses the basic expression domain and the contour-related compound expression domain together to guide the generator and identify the complexity of the expressions generated by the generator.

9 Claims, 3 Drawing Sheets

COMPOUND EXPRESSION RECOGNITION METHOD WITH FEW SAMPLES OF MULTI-DOMAIN ADVERSARIAL LEARNING

CROSS-REFERENCE TO RELATED APPLICATION

This application claims the priority benefit of China application serial no. 202210812089.6, filed on Jul. 12, 2022. The entirety of the above-mentioned patent application is hereby incorporated by reference herein and made a part of this specification.

BACKGROUND

Technical Field

The disclosure belongs to the field of computer vision facial expression recognition, and more specifically relates to a compound expression recognition method with few samples of multi-domain adversarial learning.

Description of Related Art

In natural conditions, facial expressions are often characterized with diversity and complexity. Currently, most expression datasets are mainly categorized based on six basic expression classifications, and there are difficulties in capturing the true emotional state of human beings in detail. Only a few samples are available in compound expression datasets with high-precision labels, which makes it challenging to achieve good performance in current deep learning methods.

Nowadays, compound expression recognition can be performed by using general convolutional neural network methods, such as: MobileNet, VGG, Inception-ResNet and other commonly used networks, which can be directly adopted. Although these methods may achieve certain effects, they have two limitations. Firstly, a large number of training samples are required to ensure satisfactory generality of the mode. Secondly, a method uses 15 residual blocks to detect 15 types of compound expressions as well as 6 residual blocks to detect 6 basic expressions respectively and merge them into one model. The problems of such a method are excessive network parameters and low efficiency.

Another option that can be considered is MSAU-Net. MSAU-Net is a two-stage fine-grained facial expression recognition method, in which two-stage multi-label classification is adopted. In the first stage, DRML is utilized to identify 16 AU feature maps based on coarse-grained AU detection. In the second stage, the 16 AU feature maps are refined and output. Finally, AU features are combined into multi-label through multi-label classification to identify compound expressions based on the label combinations of multiple AUs. Training and inference are performed in a two-stage network, which results in an excessively large scale of parameters in the inference and recognition phases.

Considering the foregoing, it is necessary to propose an efficient method for compound expressions recognition well-suited for scenarios with few data samples as well as small scale of parameters.

SUMMARY

In view of the above defects or needs for improvement of the related art, the present disclosure provides a compound expression recognition method with few samples of multi-domain adversarial learning. The purpose of the present disclosure is to realize compound expression recognition suitable for a few samples and has a small scale of network parameters and high recognition accuracy.

In order to achieve the above purpose, the present disclosure provides a compound expression recognition method with few samples of multi-domain adversarial learning, including the following steps: S1. collecting few sample datasets of compound expressions and basic expressions; S2. dividing the few sample datasets of compound expressions into a face sub-domain, a contour-independent compound expression sub-domain, a contour-related compound expression sub-domain and a basic expression sub-domain. The face sub-domain refers to the identity of a face that is not related to expression. The contour-independent compound expression sub-domain refers to the compound expressions features without facial contours. The contour-related compound expression sub-domain refers to the compound expressions features with facial contours. The basic expression sub-domain refers to the features of six basic expressions, including happiness, sadness, surprise, anger, fury and disgust; S3. constructing a generator, a compound expression fusing discriminator and a face identity discriminator. The generator is designed to fuse the face sub-domain and the contour-independent compound expression sub-domain. The generator predicts an image exhibiting diversity in identity and complexity in compound expressions. The compound expression fusing discriminator is designed to fuse the contour-related compound expression sub-domain with the basic expression sub-domain. The compound expression fusing discriminator guides the generator and determines the complexity of the expression in the generated compound expression image by calculating a cross transition space. The face discriminator is designed to assess whether the compound expression image generated by the generator aligns with the facial feature distribution present within the face sub-domain. The face discriminator guides the generator by providing feedback and ensures that the generated compound expression exhibits diversity in terms of identity; S4. utilizing the face sub-domain and the contour-independent compound expression sub-domain to train the generator, utilizing the face sub-domain to train the face discriminator, and utilizing the contour-related compound expression sub-domain and the basic expression sub-domain to train the compound expression fusing discriminator; S5. inputting the images including faces into the trained compound expression fusing discriminator, and outputting the classification vectors of various compound expressions. Selecting the component vector with the highest softmax value among the classification vectors, and obtaining the classification results conforming to the expressions.

Further, the generator includes a face encoding module, a contour-independent compound expression encoding module, a noise fusing module, a paired fused domain embedding module and a fused decoding module.

The face encoding module is configured to encode facial identity information that is irrelevant with expressions.

The compound expression encoding module is configured to encode contour-independent compound expression features.

The noise fusing module is configured to fuse facial feature $d_f$, contour-independent compound expression feature $d_{ce}$ with random noise $d_z$ to obtain a fusing feature.

The fusing domain embedding module embeds the fusing feature to form a paired fused domain feature $d_{pair}$.

The fused decoding module is configured to decode the paired fused domain feature $d_{pair}$ to generate an image $I_g$.

Further, the process of the generator is as follows.

$$I_g = G_{fuse}(d_{pair}) = G_{fuse}(Emb(con(\alpha \cdot d_f, \beta \cdot d_{ce}, d_z)))$$

In the equation, α and β are control parameters, which are used to control the strength of the features $d_f$ and $d_{ce}$ respectively in the fusing feature, α, β∈(0.8, 1.2]; α+β=2, where con represents the channel-wise connection operation, and Emb represents the embedding encoding.

Further, the compound expression fusing discriminator includes a compound expression recognition module, a basic expression recognition module, a compound expression fully connected layer, a basic expression fully connected layer and an expression-intersection calculation module.

The compound expression recognition module is configured to extract contour-related compound expression features.

The basic expression recognition module is configured to extract basic expression features.

The compound expression fully connected layer is configured to fully connect the contour-related compound expression features.

The basic expression fully connected layer is configured to fully connect the basic expression features.

The expression-intersection-calculation module is configured to calculate the intersection of the fully connected compound expression feature vector and the basic expression feature vector, and select the component vector with the highest softmax value as the classification result according to the intersection.

Further, the compound expression recognition module adopts the following equation to normalize the spectrum.

$$\overline{W}_{ce}(W) := \sigma(W_e) \cdot W / \sigma(W)$$

In the equation, $W_e$ represents the parameters of the basic expression recognition module, W represents the compound expression recognition module, and σ represents the standard spectral norm of a weight matrix.

Further, the contour-independent compound expression sub-domain uses AU prior knowledge, 68 face landmarks, and a landmark located in the center of the forehead for the division of AU areas.

Further, the loss function of the generator is:

$$L_G = L_C + L_D$$

$$L_C = -\{\lambda_{G_f} E_{(I_g, y_f) \sim P_g}[\log \quad D_f(I_g)] + \lambda_{G_{ce}} E_{(I_g, y_f) \sim P_g}[\log D_{fuse}(I_g)]\}$$

$$L_D = L E_{I_{ce} \sim Pdata(I_{ce}), I_e \sim Pdata(I_e)}[D_{fuse}(D_{ce}(I_{ce}), D_e(I_e))] - E_{I_g \sim P_g(I_g)}[D_{fuse}(D_{ce}(I_g), D_e(I_g))]$$

In the equations, $L_C$ represents face identity classification and compound expression classification loss, $L_D$ represents a loss function of double intersection domain, $\lambda_{G_f}$ and $\lambda_{G_{ce}}$ are control parameters, $E_{(I_g, y_f) \sim P_g}$ represents the information entropy under the distribution of $I_g$, $y_f$ obeying $p_g$, $y_f$ represents the face label, $I_g$ represents a fake face image generated by the generator, $I_{ce}$ is a compound expression input image, $y_{ce}$ represents the label of the compound expression input image, $D_{fuse}$ represents the compound expression fusing discriminator, $D_{ce}$ represents the compound expression recognition module, and $D_e$ represents the basic expression recognition module.

Further, the loss function $L_f$ of the face discriminator is as follows:

$$L_f = E_{(I_f, y_f) \sim P_f}[\log D_f(I_f)] E_{(I_g, y_f) \sim P_g}[\log D_f(I_g)]$$

$D_f$ represents the face discriminator, and $y_g$ represents the face and compound expression label of the generated image.

Further, the loss function $L_{ce}$ of the compound expression fusing discriminator is as follows:

$$L_{ce} = E_{(I_{ce}, y_{ce}) \sim P_{ce}}[\log \quad D_{ce}(I_{ce})] E_{(I_e, y_e) \sim P_e}[\log \quad D_e(I_e)] \\ E_{(I_g, y_f) \sim P_g} \log D_{fuse}(I_g)]$$

$p_{ce}$ represents the distribution of compound expression.

DESCRIPTION OF THE EMBODIMENTS

Figure 1:
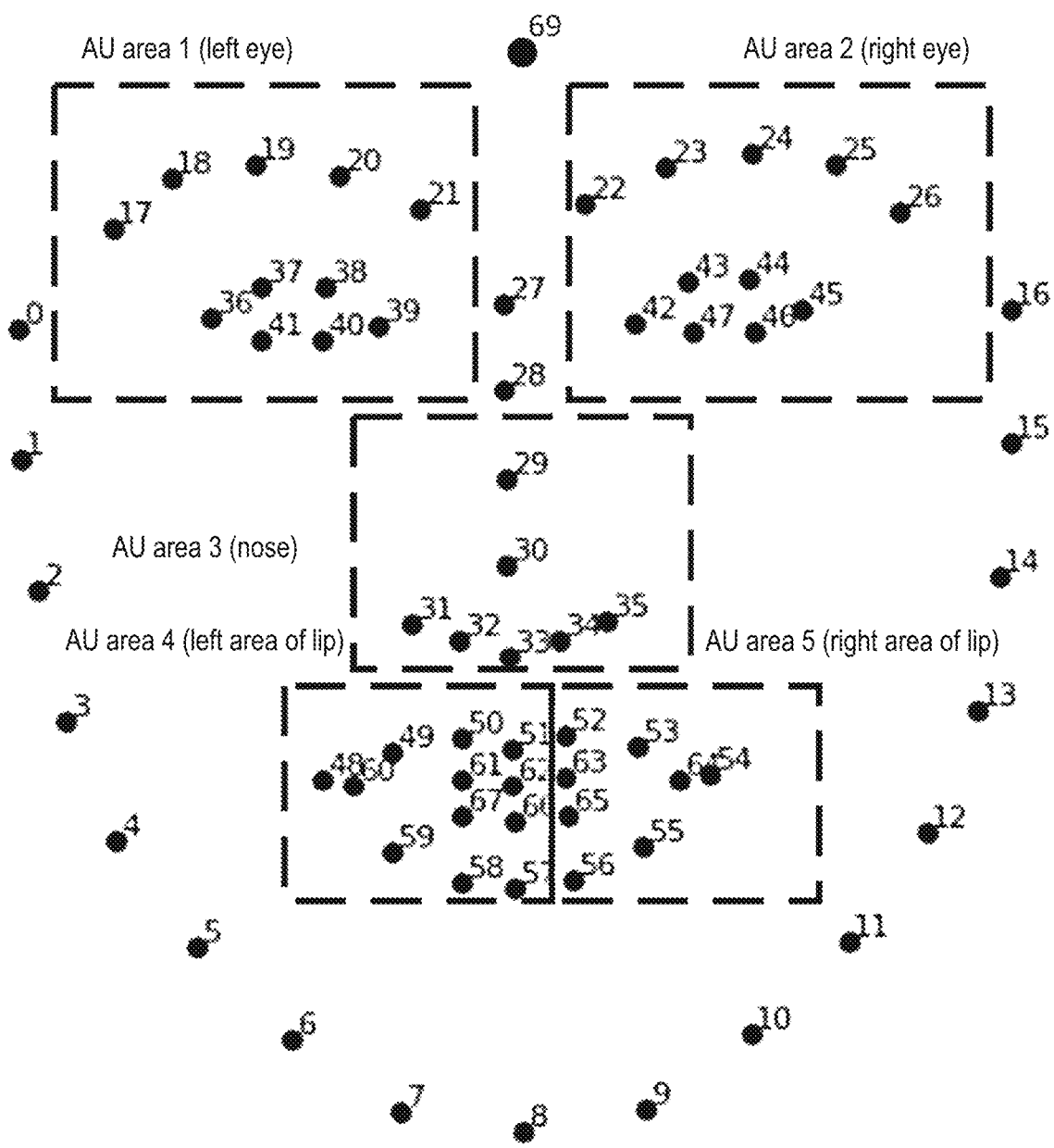
FIG. 1 is a schematic diagram of a training network framework.

In order to clearly describe the object, technical solution, and advantages of the present disclosure, descriptions in the present disclosure will be incorporated in detail below with reference to the accompanying drawings and embodiments. It is important to note that the specific embodiments are intended solely for the purpose of illustrating the present disclosure. They should not be interpreted as limiting the scope of the present disclosure in any way. In addition, the technical features involved in the various embodiments of the present disclosure described below can be combined with each other as long as they do not conflict with each other.

The present disclosure provides a compound expression recognition method with few samples with multi-domain adversarial learning, which includes the following steps:

Step S1 is performed to collect the few sample datasets of compound expressions and basic expression.

Step S2 is performed to divide the few sample datasets of compound expressions and basic expression into a face sub-domain, a contour-independent compound expression sub-domain, a contour-related compound expression sub-domain and a basic expression sub-domain.

Specifically, the few-sample compound expression dataset adopted in the present disclosure is established to understand the facial expression responses of people's compound emotions. It has 22 categories, 6 of them are basic expressions (happiness, fury, sadness, disgust, surprise, and fear), 1 of them is neutral expression, and 15 of them are compound expressions.

The dataset has a total of 230 sequences, 22 expression categories, and 6670 expression images, which are divided into four subsets according to the requirements of multi-domain learning in the present disclosure. In the dataset, subset No. 1 has a total of 230 images of neutral expressions, which are adopted by the present disclosure to construct the face domain. The subset No. 2 includes 6 basic expression categories with a total of 1610 images, which are defined by the present disclosure as the basic expression domain. There is a total of 5060 images of the remaining 15 compound expressions, which are defined by the present disclosure as the compound expression domain. The 15 compound expressions are copied into two copies, one copy is directly used as a contour-related compound expression sub-domain without pre-processing, and the other copy is divided and constructed as a contour-independent compound expression sub-domain.

The purpose of the pairing is to fuse the local information of the AU (action unit) area that is not related to the contour and the global area of the face that contains the contour, thereby expanding the data diversity of the compound expression. In order to generate face images with diversity and complexity, the pre-processing of the present disclosure uses the hard coding of the AU area. Utilizing hard coding will cause random loss of some local information. However, since the cross information from the basic expression and the contour-related compound expression domains may be supplemented during the training phase, it is possible to prevent overfitting results from a single feature under small samples.

Therefore, the pre-processing of the present disclosure adopts a hard coding method for area division based on AU prior knowledge. Firstly, the present disclosure adopts a conventional 68 facial landmarks to locate facial areas. Then, the AU prior knowledge is adopted to divide the area into 5 AU areas, as shown in FIG. 1, and the AU areas are explained in Table 1. In order to obtain the AU changes produced by the frontal lobe and frown muscle mass, the present disclosure introduces a specific landmark identified as No. 69, which is located in the central area of the forehead. Positioning and acquisition of AU areas 1 and 2 will be subjected to the landmark No. 69. Due to individual differences, not all of individual compound expressions have completely consistent AU encoding combinations. Therefore, individual AU areas might randomly lose local information, which is also a premise factor for generating diversity in the present disclosure.

TABLE 1

Definition of contour-independent AU areas

| AU area | AU code | Face landmark 68 | Definition |
|---|---|---|---|
| 1 | 1, 2, 4, 5, 6, 7 | 17, 18, 19, 20, 21, 36, 37, 38, 39, 40, 41 | left eye area |
| 2 | 1, 2, 4, 5, 6, 7 | 22, 23, 24, 25, 26, 42, 43, 44, 45, 46, 47 | right eye area |
| 3 | 9, 11 | 29, 30, 31, 32, 33, 34, 35 | nose area |
| 4 | 10, 12, 15, 16, 17, 18, 24, 25, 26 | 48, 49, 50, 51, 60, 61, 62, 67, 66, 57, 58, 59 | left area of mouth |
| 5 | 10, 12, 15, 16, 17, 18, 24, 25, 26 | 54, 53, 52, 51, 62, 63, 64, 66, 65, 57, 56, 55 | right area of mouth |

The macro-expression dataset selected by the present disclosure mainly involves 6 basic expressions, consists of 123 subjects, and contains a total of 1236 expression sequences. If the expression peak frame serves as the basic expression, 1236 images are available.

A total of 353 face identities in the two datasets are adopted as the face domain, which is used as the paired input face of the network, and the 2846 basic expressions contained therein are used as the training set and the test set. In the two small sample datasets, there are 353 face identities, 2846 basic expressions, 5060 compound expressions, 5060 contour-independent compound expressions, and a total of 7906 images.

Compared with other large-scale expression datasets of hundreds of thousands of levels, the sample space of the dataset selected by the present disclosure is minimal, which is convenient for carrying out multi-domain adversarial experiments with few samples of small samples. The features of the present disclosure with few samples are boundary conditions of values of the above data.

Step S3 is performed to construct a generator, a compound expression discriminator, and a face identity discriminator.

Different from other generative adversarial networks, the present disclosure fuses face sub-domain and contour-independent compound expression sub-domain in the generator to generate compound expression images with diverse identity. By constructing a face discriminator and a compound expression discriminator, the cross transition space is calculate by fusing contour-related expression sub-domain and basic expression sub-domain, the generator is guided to generate the face images with the compound expression. Finally, the obtained compound expression discriminator possesses the stable ability in discriminating both diversity and complexity.

Figure 2:
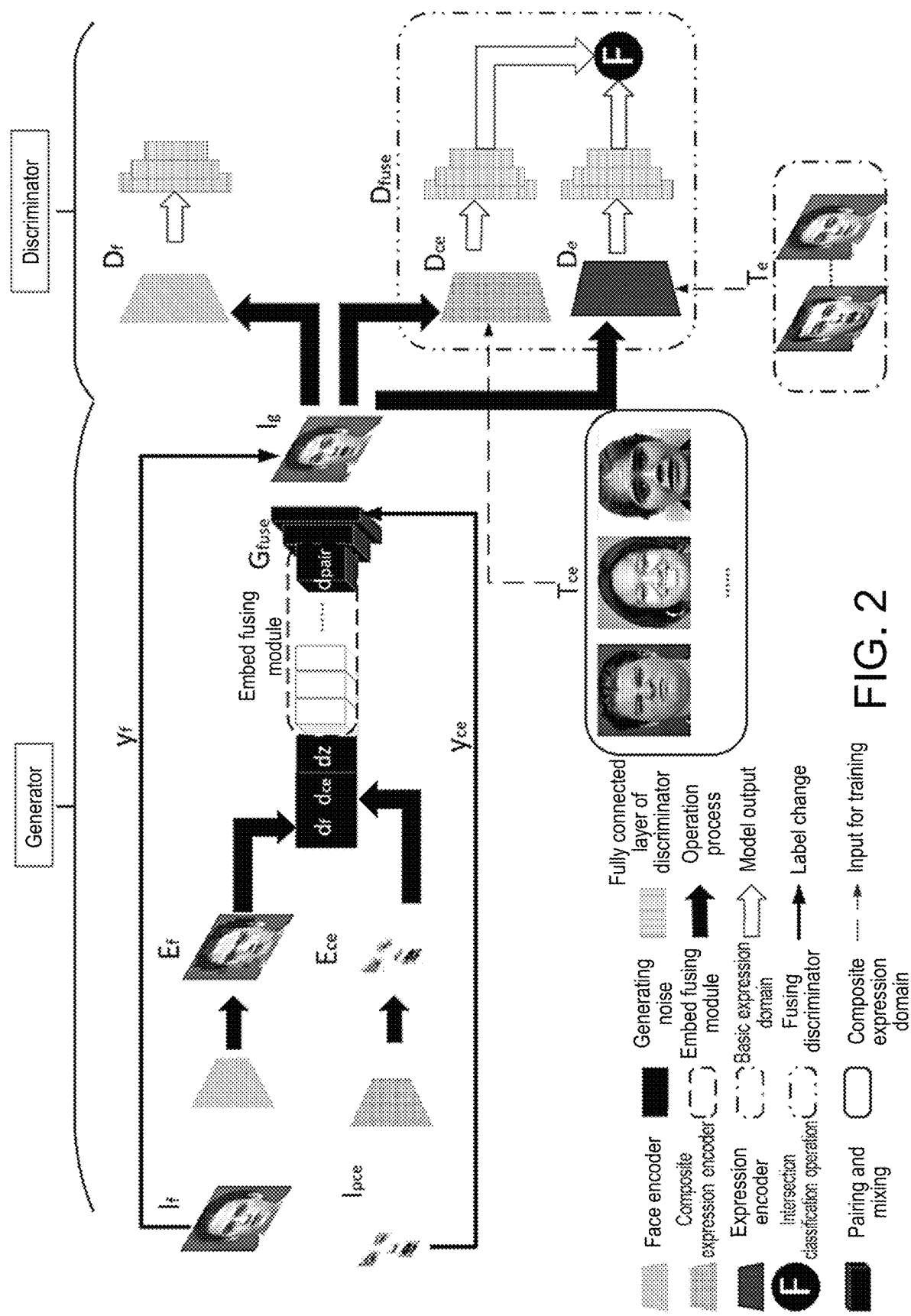
FIG. 2 is the definition of an AU area of a contour-independent compound expression feature.

The framework of the network is shown in FIG. 2, where the symbols in FIG. 2 are shown in Table 2:

TABLE 2

Definitions of symbols in the network framework

| Symbols | Definition and Description |
|---|---|
| $I_f$ | Input image for face sub-domain |
| $I_{pce}$ | Input image for contour-independent compound expression domain divided based on AU area prior knowledge |
| $I_g$ | Fake face image synthesized by generator |
| $E_f$ | Encoding of facial feature |
| $E_{ce}$ | Encoding of compound expression feature |
| $d_f$ | Face mixing module |
| $d_{ce}$ | Compound expression feature mixing module |
| $d_z$ | Noise mixing module |
| $d_{pain}$ | Embedded encoding module that is mixed with facial features, contour-independent compound expression features, and noise for pairing |
| $G_{fuse}$ | Generator decodes mixed features to synthesize synthetic images with diverse compound expression features |
| $T_e$ | Basic expression sub-domain |
| $T_{ce}$ | Contour-related compound expression sub-domain |
| $D_f$ | Face ID Discriminator |
| $D_{fuse}$ | Compound expression fusing discriminator, fusing $D_{ce}$ and $D_e$ |
| $D_{ce}$ | Compound expression recognition module |
| $D_e$ | Basic expression recognition module (e.g., happiness, surprise, sadness, etc.) |

Generator: The purpose of the generator is to generate images with both identity diversity and compound expression complexity. The generator encodes contour-independent compound expression $I_{pce}$ and face $I_f$ according to two sets of inputs. The contour-independent compound expression feature encoding module $E_{ce}$ is responsible for encoding compound expression, and the facial feature encoding module $E_f$ encodes face identity information that is not related to expression, such as contour and texture. The paired fusing domain embedding module embeds and fuses the facial feature $d_f$, the contour-independent compound expression feature $d_{ce}$ and random noise $d_z$ to form a paired mixed domain feature encoding $d_{pair}$.

Equation (1) defines the entire calculation process of the generator. By controlling the integration of face and expression features with random noise, the paired fusing domain embedding module performed the channel-wise feature fusion and embedding operation to form the generated features. Then, the generated features are decoded to generate a image containing face and compound expression information.

$$I_g = G_{fuse}(d_{pair}) = G_{fuse}(Emb(con(\alpha \cdot d_f, \beta \cdot d_{ce}, d_z))), \text{ where } \alpha, \beta \in (0.8, 1.2]; \alpha + \beta = 2 \quad (1)$$

The image $I_g$ is generated by decoding the feature in the paired fusing domain embedding module by the fused decoding module $G_{fuse}$, where con represents matrix addition (channel-wise concatenation), and Emb means the embedding encoding, $\alpha$ and $\beta$ are control parameters for controlling the feature strengths of $d_f$ and $d_{ce}$ in the embedding encoding. That is, $\alpha$ and $\beta$ are respectively used to control the diverse effects of the generated face of the compound expression. If $\alpha > \beta$, the generated feature is more inclined to the face identity feature $I_f$, otherwise the generated feature is more inclined to the $I_{ce}$ compound expression feature. Since a needs to control the contour-related information, and in order to ensure the identity consistency through the discriminator $D_f$, $\alpha$ should be at least greater than 0.8; $\beta$ puts more emphasis on the local compound expression features of facial features, and is configured to control the diversity and complexity that are generated, and therefore $\beta$ should not be less than 1. Therefore, equation (1) satisfies the boundary constraints of $\alpha$, $\beta \in (0.8, 1.2]$ and $\alpha + \beta = 2$.

Discriminator: The method of the present disclosure is different from the basic generative adversarial network. The method of the present disclosure includes two discriminators. The face discriminator $D_f$ is responsible for identifying identity information that have nothing to do with expressions, so as to help the generator generate diverse identity information; the compound expression fusing discriminator $D_{fuse}$ is responsible for capturing expression-related features. It achieves this goal by combining the contour-related compound expression feature $D_{ce}$ and the basic expression features $D_e$ into the discriminator. This fusion allows the calculation of intersecting expression features, effectively guiding the generator to produce compound expressions that exhibit both diversity and complexity. The identification effect of $D_{fuse}$ is also the ultimate goal of the present disclosure. The identification ability of $D_{fuse}$ is mainly used in the inferring and verification stage, and its performance determines the identification effect of the compound expression trained with few samples.

The result matrix of compound expression fusing discriminator $D_{fuse}$ is initialized with the classification results of 15 compound expressions output by $D_{ce}$. Then, the 6 basic expressions are filled in the corresponding positions. The compound expression fusing discriminator combines two discriminator modules to produce the final compound expression classification result, which may be expressed as:

$$D_{fuse}(D_{ce}, D_e) = F, F_{i,j} = (\theta \cdot C_{i,j} + \mu(E_i + E_j)) \times \text{init, where } \theta + \mu = 1 \quad (2)$$

In the equation, i and j represent the expression classification positions of i and j respectively, that is, the pairwise combination of expressions. $F_{i,j}$ represents the classification result of the compound expression fusing discriminator, $C_{i,j}$ represents the classification result of the compound expression recognition module, $E_x$ represents the classification result of the basic expression, where init represents the initialization value of the compound expression matrix.

Specifically, $\theta$ and $\mu$ are adjustable parameters that control compound expression and basic classification to affect the fusion result. The goal of equation (2) is to calculate the most likely expression intersection in the fusion matrix, which includes both the result of the compound expression itself and the influence of the basic expression. Since it is impossible to have a mutually exclusive combination of basic expressions (for example: two sets of actions showing happiness and sadness on the face at the same time), the impossible combination of expression intersections is also avoided.

The generator determines the diversity of samples, which is a key factor to improve the performance of compound expression recognition. A stable generator will help to generate samples stably and avoid diversity loss caused by small number of samples. The present disclosure uses spectral norm (SN) to constrain the discriminator, which controls the boundary of the generator to reduce instability. Since the discriminator fuses two sub-discriminators $D_{ce}$ and $D_e$, the training samples of the discriminator are derived from the contour-related compound expression domain and the basic expression domain. Therefore, there are two separate sets of networks. Generally speaking, standard SN utilizes power iterations to estimate the threshold norm of the activation matrix of each layer of the network, and the weight matrix of the network is then divided by the spectral norm to obtain a boundary constraint, which is approximately constrained to be the Lipschitz constant, thereby avoiding the instability at module level.

If they are all normalized by SN, it is found that $D_e$ reaches the Lipschitz constant faster than $D_{ce}$ according to experiments. Moreover, experiments have shown that using the SN norm of $D_e$ as a multiplier for standard spectral normalization helps to balance the normalization speed of the two sets of parameters, as defined by equation (3). Specifically, the present disclosure uses the following update rule for spectral normalization, where $\sigma$ denotes the standard spectral norm of the weight matrix:

$$\overline{W}_{ce}(W) := \sigma(W_e) \cdot W / \sigma(W) \quad (3)$$

In the equation, $W_e$ represents the parameters of the basic expression recognition module, W represents the parameters of the compound expression recognition module, $D_{ce}$ and $D_e$ have their own independent parameters and fully connected (FC) layer, and SN mainly controls the parameters of the FC layer and the former layer, so the parameters are controlled separately using independent SNs within their respective network ranges.

Step S4 is performed to utilize the face sub-domain and the contour-independent compound expression sub-domain to train the generator, utilize the face sub-domain to train the face discriminator, and utilize the contour-related compound expression sub-domain and the basic expression sub-domain to train the compound expression fusing discriminator.

Training loss: The overall goal of training the discriminator is to distinguish between compound expressions and faces, while verifying whether the features of compound expressions and faces are correctly separated through consistency constraints. The compound expression fusing discriminator $D_{fuse}$ deals with compound expression recognition tasks, where there are 15 types of compound expressions, namely $K_{ce}=15$, $D_{fuse} \in R^{K_{ce}}$. The face discriminator handles the face recognition task, $D_f \in R^{K_f+1}$, $K_f+1$ represents the classification task of $K_f$ faces and 1 non-ensemble face. The loss function $L_f$ of the face discriminator considers the joint situation of real faces and generated faces. The loss function $L_{ce}$ of compound expression fusing discriminator includes compound expression identification, basic expression identification and fusion identification of the two, and may be defined as the following equation:

$$L_f = E_{(I_f, y_f) \sim p_f}[\log D_f(I_f)] + E_{(I_g, y_g) \sim p_g}[\log D_f(I_g)] \quad (4)$$

$$L_{ce} = E_{(I_{ce}, y_{ce}) \sim p_{ce}}[\log D_{ce}(I_{ce})] + E_{(I_e, y_e) \sim p_e}[\log D_e(I_e)] + E_{(I_g, y_g) \sim p_g}[\log D_{fuse}(I_g)] \quad (5)$$

$E_{(I_f, y_f) \sim p_f}$ means the information entropy under the distribution of $I_f$, $y_f$ obeying $p_f$, $y_f$ means the face label, $E_{(I_g, y_g) \sim p_g}$ means the information entropy under the distribution of $I_g$, $y_g$ obeying $p_g$, $y_g$ means the face and compound expression label of the generated image, $E_{(I_{ce}, y_{ce}) \sim p_{ce}}$ represents the information entropy under the distribution of $I_{ce}$, $y_{ce}$ obeying $p_{ce}$, $I_{ce}$ represents the compound expression input image, $y_{ce}$ represents the label of the compound expression input image, $p_{ce}$ represents the distribution of compound expression, $E_{(I_g, y_g) \sim p_g}$ represents the information entropy under the distribution of $I_g$, $y_g$ obeying $p_g$, $E_{(I_e, y_e) \sim p_e}$ represents the information entropy under the distribution of $I_e$, $y_e$ obeying $p_e$, $E_{(I_g, y_g) \sim p_g}$ represents the information entropy under the distribution of $I_g$, $y_g$ obeying $p_g$, and $D_f$ guides the generator to generate diverse identities through the distribution of the face domain. The training of $D_{fuse}$ mainly guides the generator to generate a fake face image $I_g$. Since $I_g$ obtains the real label from $I_{pce}$, $I_g$ may be directly identified. Since $D_{fuse}$ contains $D_{ce}$ and $D_e$, $D_{ce}$ is trained by the contour-related domain of the compound expression, which contains 15 categories, while $D_e$ is trained through the basic expression domain. Although the basic expression domain only contains 6 basic labels, 15 categories may be calculated through equation (2). Therefore, it is possible to keep a size consistent with the training result of $D_{fuse}$. $D_{fuse}$ contains compound expressions, basic expressions, and discriminative losses for generating fake expressions. Equation (4) is provided for the training of $D_f$ and equation (5) is provided for the training of $D_{fuse}$.

The purpose of the generator is producing diverse and compound results to deceive the two discriminators. Therefore, it is necessary to extract compound expression features that are not related to facial features and contours as many as possible. It is required to classify the loss, and the classification consists of face identity classification and compound expression classification, as defined in equation (6). The loss function equation is defined as follows:

$$L_C = -\{\lambda_{G_f} E_{(I_g, y_f) \sim p_g}[\log D_f(I_g)] + \lambda_{G_{ce}} E_{(I_g, y_{ce}) \sim p_g}[\log D_{fuse}(I_g)]\} \quad (6)$$

In the equation, $\lambda_{G_f}$ and $\lambda_{G_{ce}}$ are control parameters, which are configured to control whether the generation direction is inclined to facial features or compound expression features. Because compound expression features rely on hard-encoded local information, the discriminator needs to give more support because $D_{fuse}$ also contains the basic expression information of these domains. Therefore, $1.5\lambda_{G_f} \geq \lambda_{G_{ce}} > \lambda_{G_f}$ is recommended in the present disclosure.

Since $D_{fuse}$ combines contour-related domain and the basic expression domain of the compound expression, and the generator performs generation by using the pairing of the face domain and the contour-independent domain of the compound expression, there are certain differences between the two sets of domains. The purpose of this disclosure is to find the cross domain of the two sets of domains as the training target, and the Wasserstein distance is adopted as the cross-entropy for generating adversary. For this purpose, the Wasserstein distance is improved with respect to the characteristics of the fusion domain, and a double intersection domain loss function is designed to help the generator achieve the goal, as expressed in the following:

$$L_D = E_{I_{ce} \sim Pdata(I_{ce}), I_e \sim Pdata(I_e)}[D_{fuse}(D_{ce}(I_{ce}), D_e(I_e))] - E_{I_g \sim P_g(I_g)}[D_{fuse}(D_{ce}(I_g), D_e(I_g))] \quad (7)$$

$I_{ce} \sim Pdata(I_{ce})$ represents $I_{ce}$ obeying the distribution of $Pdata(I_{ce})$, $I_e \sim Pdata(I_e)$ represents $I_e$ obeying the distribution of $Pdata(I_e)$, and $I_g \sim P(I_g)$ represents $I_g$ obeying the distribution of $P(I_g)$. Equation (7) illustrates the loss is minimized as the mixed identification result of $I_g$ and mixed identification results of $I_{ce}$ and $I_e$, that is, the generated expression should include compound expression and basic expression in the sample.

By combining equation (6) and equation (7), the loss function of the generator may be defined as follows:

$$L_G = L_C + L_D \quad (8)$$

Through equation (8), the parameters may be updated during the generator training process.

Configuration for training network: default hyperparameters of the network: $\alpha = 0.9$, $\beta = 1.1$, $\theta = 0.5$, $\mu = 0.5$, $\lambda_{G_f} = 1$, $\lambda_{G_{ce}} = 1.2$.

Step S5 is performed to input generated face images into the trained compound expression fusing discriminator, output classification vectors of various compound expressions, select the component vector with the highest softmax value among the classification vectors, and obtain the classification results that match the expressions.

Figure 3:
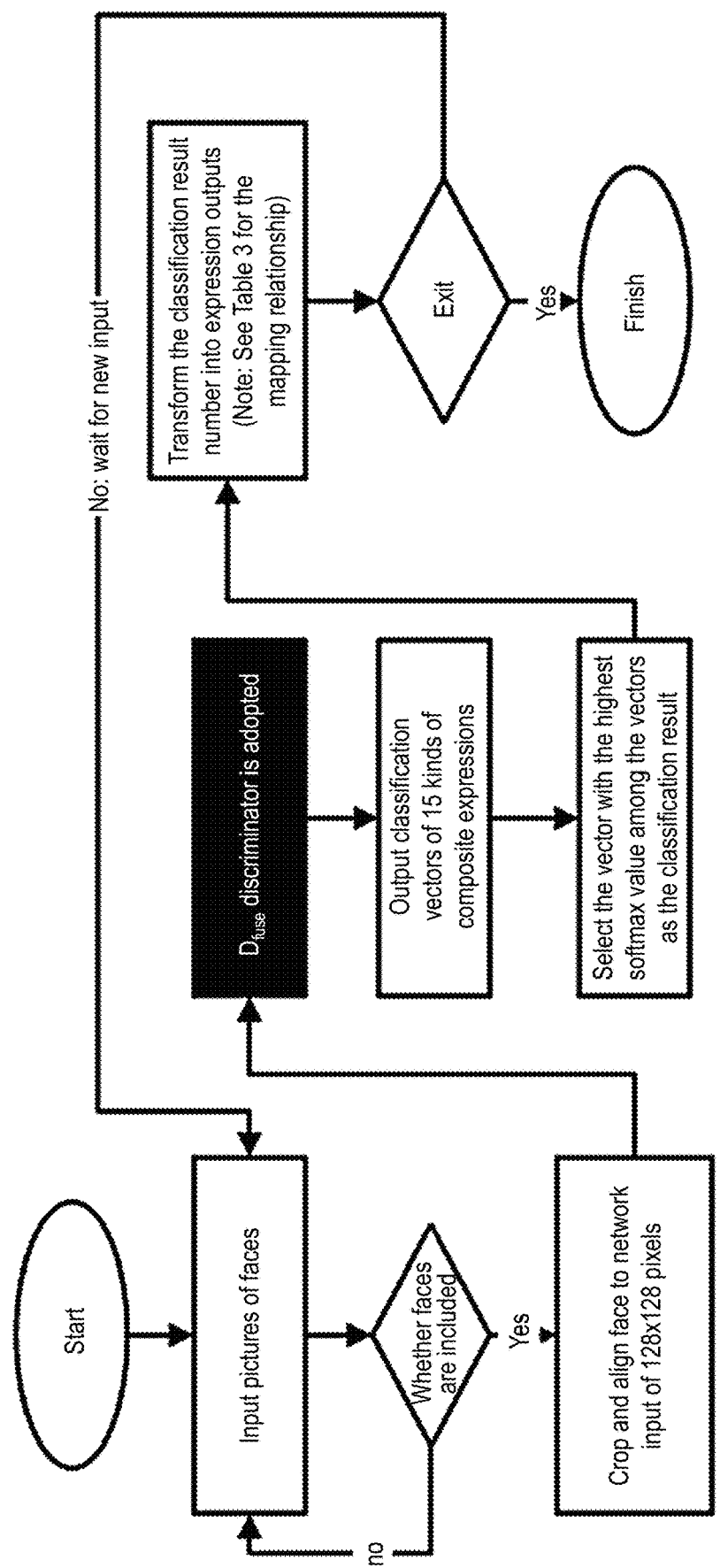
FIG. 3 is a flowchart of making inference and recognition.

The present disclosure only adopts the $D_{fuse}$ discriminator when making inference, and the model has about 29.3 million parameters, and the advantage thereof is that the complexity of network parameters during inferring is small, while the recognition accuracy of compound expression is high. After completing the network training, the obtained $D_{fuse}$ discriminator model will be used for inferring process, as shown in FIG. 3. The output classification result is the corresponding vector number with the largest softmax value, and the vector number is transformed into a compound expression label, and is mapped through mapping table of the expression and the classification result, see Table 3.

TABLE 3

Mapping relationship between classification results and expressions

| No. of result | Code | Chinese label | English label |
|---|---|---|---|
| 1 | HS | 高兴惊讶 | Happily surprised |
| 2 | HD | 高兴厌恶 | Happily disgusted |
| 3 | SA | 悲伤生气 | Sadly angry |
| 4 | AD | 生气厌恶 | Angrily disgusted |
| 5 | AP | 惊骇 | Appalled |
| 6 | HT | 仇恨 | Hatred |
| 7 | AS | 生气惊讶 | Angrily surprised |
| 8 | SS | 伤感吃惊 | Sadly surprised |
| 9 | DS | 厌恶吃惊 | Disgustedly surprised |
| 10 | FS | 害怕吃惊 | Fearfully surprised |
| 11 | AW | 畏怯 | Awed |
| 12 | SF | 悲伤害怕 | Sadly fearful |
| 13 | FD | 害怕厌恶 | Fearfully disgusted |
| 14 | FA | 害怕生气 | Fearfully angry |
| 15 | SD | 悲伤厌恶 | Sadly disgusted |

Compared with the related art, the above technical solutions conceived by the present disclosure may achieve the following advantageous effects.

Based on the known AU prior knowledge, the present disclosure believes that the compound expression emerge during the transitional stages of basic expressions; therefore, it is posited that compound expressions emerge within the cross-space bridging two distinct basic expressions. Moreover, it is possible to fuse the local features of AU with the global feature encoding of the contour to generate diverse compound expressions. This fusion approach aims to enhance the available data in the few sample datasets. Specifically, in order to obtain a model that encompasses both identity diversity and expression complexity, the present disclosure combines the face domain and the contour-independent compound expression domain to extract features separately and fuse them to generate images with both diversity and complexity in terms of expressions.

In the meantime, to effectively identify compound expressions, two discriminators are adopted to identify identity and expression features respectively. By employing these discriminators, the mutual influence of the two sets of features is reduced, leading to more accurate and reliable compound expression identification. The present disclosure believes that the intersection of basic expressions and compound expressions may improve the capability of discriminating compound expressions. Therefore, a fusion method is adopted to fuse contour-related compound expressions and basic expression features and calculate the cross space, so as to obtain a discriminator with improved compound expression recognition performance. Specifically, in the expression discriminator, the compound expression recognition module is utilized to extract the features of the compound expression sub-domain, and the basic expression recognition module is utilized to extract the features of the basic expression sub-domain; the two sets of features are fully connected, respectively, and by constructing the two sets of fully connected results and calculating the intersection space, the recognition result of the compound expression may be obtained. The disclosure can obtain a small-size recognition model with high generalization on the few sample datasets.

It is easy for those skilled in the art to understand that the above descriptions are only preferred embodiments of the present disclosure, and are not intended to limit the present disclosure. Any modifications, equivalent replacements and improvements made within the spirit and principles of the present disclosure should all be included within the scope to be protected by the present disclosure.

What is claimed is:
1. A compound expression recognition method with few samples of multi-domain adversarial learning, comprising:
    S1: collecting few sample datasets of compound expressions;
    S2: dividing the small sample dataset of the compound expressions into a face sub-domain, a contour-independent compound expression sub-domain, a contour-related compound expression sub-domain and a basic expression sub-domain;
    wherein the face sub-domain refers to the face identity set that is irrelevant with the expression, the contour-independent compound expression sub-domain refers to the compound expressions features without facial contours, the contour-related compound expression sub-domain refers to the compound expressions features with facial contours, the basic expression sub-domain refers to the features of six basic expressions, including happiness, sadness, surprise, anger, fury and disgust;
    S3: constructing a generator, a compound expression discriminator, and a face identity discriminator;
    wherein the generator is configured to fuse the face sub-domain and the contour-independent compound expression sub-domain to generate an image with both identity diversity and compound expression complexity;
    the compound expression fusing discriminator is configured to mix combine the contour-related compound expression sub-domain and with the basic expression sub-domain, wherein by calculating a cross transition space, it guides the generator and determines the complexity of the expression in the generated compound expression image;
    the face discriminator is configured to assess whether the compound expression image generated by the generator adheres to the facial feature distribution within the face sub-domain, which guides the generator by providing feedback and ensures that the generated compound expression exhibits diversity in terms of identity;
    S4: utilizing the face sub-domain and the contour-independent compound expression sub-domain to train the generator, utilizing the face sub-domain to train the face discriminator, and utilizing the contour-related compound expression sub-domain and the basic expression sub-domain to train the compound expression fusing discriminator;
    S5: inputting pictures comprising the faces into the trained compound expression fusing discriminator, outputting classification vectors of a plurality of the compound expressions, selecting a component vector with the highest softmax value among the classification vectors, and obtaining classification results that match the expressions.

2. The compound expression recognition method with few samples of multi-domain adversarial learning according to claim 1, wherein the generator comprises a face encoding module, a contour-independent compound expression encoding module, a noise fusing module, a paired fused domain embedding module and a fused decoding module;
    wherein the face encoding module is configured to encode facial identity information that is irrelevant with the expressions;
    the compound expression encoding module is configured to encode contour-independent compound expression features;
    the noise fused module is configured to fuse a facial feature $d_f$, a contour-independent compound expression feature $d_{ce}$ with a random noise $d_z$ to obtain a fusing feature;
    the fusing domain embedding module embeds the fusing feature to form a paired mixed domain feature $d_{pair}$;
    the fused decoding module is configured to decode the paired fused domain feature $d_{pair}$ to generate an image $I_g$.

3. The compound expression recognition method with few samples of multi-domain adversarial learning according to claim 2, wherein a processing process of the generator is:

$$I_g = G_{fuse}(d_{pair}) = G_{fuse}(Emb(con(\alpha \cdot d_f, \beta \cdot d_{ce}, d_z)))$$

wherein $\alpha$ and $\beta$ are control parameters, which are used to control a strength of the features $d_f$ and $d_{ce}$ in the fusing feature, $\alpha, \beta \in (0.8, 1.2]$; $\alpha + \beta = 2$, wherein con represents a channel-wise connection operation, and Emb represents the embedding module.

4. The compound expression recognition method with few samples of multi-domain adversarial learning according to claim 2, wherein the compound expression fusing discriminator comprises a compound expression recognition module, a basic expression recognition module, a compound expression fully connected layer, a basic expression fully connected layer and a expression-intersection-calculation module;
- the compound expression recognition module is configured to extract contour-related compound expression features;
- the basic expression recognition module is configured to extract basic expression features;
- the compound expression fully connected layer is configured to fully connect the contour-related compound expression features;
- the basic expression fully connected layer is configured to fully connect the basic expression features;
- the expression-intersection-calculation module is configured to calculate an intersection of a fully connected compound expression feature vector and a basic expression feature vector, and select the component vector with the highest softmax value as the classification result according to the intersection.

5. The compound expression recognition method with few samples of multi-domain adversarial learning according to claim 4, wherein the compound expression recognition module adopts the following equation to normalize a spectrum;

$$\overline{W}_{ce}(W):=\sigma(W_e)\cdot W/\sigma(W)$$

wherein $W_e$ represents parameters of the basic expression recognition module, W represents the compound expression recognition module, and $\sigma$ represents a standard spectral norm of a weight matrix.

6. The compound expression recognition method with few samples of multi-domain adversarial learning according to claim 1, wherein the contour-independent compound expression sub-domain uses AU prior knowledge, 68 face landmarks, and a landmark located in a center of a forehead for division of AU areas.

7. The compound expression recognition method with few samples of multi-domain adversarial learning according to claim 1, wherein a loss function of the generator is:

$$L_G=L_C+L_D$$

$$L_C=-\{\lambda_{G_f}E_{(I_g,y_f)\sim p_g}[\log D_f(I_g)]+\lambda_{G_{ce}}E_{(I_g,y_{ce})\sim p_g}[\log D_{fuse}(I_g)]\}$$

$$L_D=E_{I_{ce}\sim Pdata(I_{ce}),I_e\sim Pdata(I_e)}[D_{fuse}(D_{ce}(I_{ce}),D_e(I_e))]-E_{I_g\sim Pg(I_g)}[D_{fuse}(D_{ce}(I_g),D_e(I_g))]$$

wherein $L_C$ represents a face identity classification and a compound expression classification loss, $L_D$ represents a loss function of a double intersection domain, $\lambda_{G_f}$ and $\lambda_{G_{ce}}$ are control parameters, $E_{(I_g,y_f)\sim p_g}$ represents an information entropy under a distribution of $I_g$, $y_f$ obeying $p_g$, $y_f$ represents a face label, $I_g$ represents a fake face image generated by the generator, $I_{ce}$ is a compound expression input image, $y_{ce}$ represents a label of the compound expression input image, $D_{fuse}$ represents the compound expression fusing discriminator, $D_{ce}$ represents a compound expression recognition module, and $D_e$ represents a basic expression recognition module.

8. The compound expression recognition method with few samples of multi-domain adversarial learning according to claim 7, wherein a loss function $L_f$ of the face discriminator is:

$$L_f=E_{(I_f,y_f)\sim p_f}[\log D_f(I_f)]+E_{(I_g,y_g)\sim p_g}[\log D_f(I_g)]$$

wherein $D_f$ represents the face discriminator, and $y_g$ represents the face and the compound expression label of the generated image.

9. The compound expression recognition method with few samples of multi-domain adversarial learning according to claim 8, wherein a loss function $L_{ce}$ of the compound expression fusing discriminator is:

$$L_{ce}=E_{(I_{ce},y_{ce})\sim p_{ce}}[\log\ D_{ce}(I_{ce})]+E_{(I_e,y_e)\sim p_e}[\log\ D_e(I_e)]+E_{(I_g,y_g)\sim p_g}[\log\ D_{fuse}(I_g)]$$

$p_{ce}$ represents a distribution of the compound expressions.

* * * * *